United States Patent
Lesage et al.

(10) Patent No.: US 10,808,105 B2
(45) Date of Patent: Oct. 20, 2020

(54) RUBBER COMPOSITION INCLUDING A HYDROCARBON RESIN WITH A LOW GLASS TRANSITION TEMPERATURE

(71) Applicant: COMPAGNIE GENERALE DES ETABLISSEMENTS MICHELIN, Clermont-Ferrand (FR)

(72) Inventors: Pierre Lesage, Clermont-Ferrand (FR); Fabien Hellot, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 178 days.

(21) Appl. No.: 15/749,261

(22) PCT Filed: Jul. 7, 2016

(86) PCT No.: PCT/EP2016/066085
§ 371 (c)(1),
(2) Date: Jan. 31, 2018

(87) PCT Pub. No.: WO2017/021093
PCT Pub. Date: Feb. 9, 2017

(65) Prior Publication Data
US 2018/0223083 A1 Aug. 9, 2018

(30) Foreign Application Priority Data
Jul. 31, 2015 (FR) ...................... 15 57404

(51) Int. Cl.
| | |
|---|---|
| C08K 3/00 | (2018.01) |
| C08L 9/06 | (2006.01) |
| B60C 1/00 | (2006.01) |
| C08L 9/00 | (2006.01) |
| C08K 3/36 | (2006.01) |
| C08K 5/00 | (2006.01) |
| C08L 101/12 | (2006.01) |

(52) U.S. Cl.
CPC .............. *C08L 9/06* (2013.01); *B60C 1/0016* (2013.01); *C08K 3/36* (2013.01); *C08K 5/0016* (2013.01); *C08L 9/00* (2013.01); *C08L 101/12* (2013.01)

(58) Field of Classification Search
CPC .......... C08K 3/00; C08K 3/36; C08K 5/0016; C08K 2003/2296; C08K 5/18; C08K 5/47; C08L 9/06; C08L 101/12; C08L 9/00; C08L 45/00; C08L 7/00; B60C 1/0016; C08F 236/10
USPC ....................................................... 523/152
See application file for complete search history.

(56) References Cited

U.S. PATENT DOCUMENTS

| | | |
|---|---|---|
| 5,227,425 A | 7/1993 | Rauline |
| 5,852,099 A | 12/1998 | Vanel |
| 5,900,449 A | 5/1999 | Custodero et al. |
| 5,977,238 A | 11/1999 | Labauze |
| 6,013,718 A | 1/2000 | Cabioch et al. |
| 6,420,488 B1 | 7/2002 | Penot |
| 6,503,973 B2 | 1/2003 | Robert et al. |
| 6,536,492 B2 | 3/2003 | Vasseur |
| 6,774,255 B1 | 8/2004 | Tardivat et al. |
| 6,815,473 B2 | 11/2004 | Robert et al. |
| 7,217,751 B2 | 5/2007 | Durel et al. |
| 7,250,463 B2 | 7/2007 | Durel et al. |
| 7,300,970 B2 | 11/2007 | Durel et al. |
| 7,312,264 B2 | 12/2007 | Gandon-Pain |
| 7,335,692 B2 | 2/2008 | Vasseur et al. |
| 7,488,768 B2 | 2/2009 | Tardivat et al. |
| 7,491,767 B2 | 2/2009 | Durel et al. |
| 7,820,771 B2 | 10/2010 | Lapra et al. |
| 7,825,183 B2 | 11/2010 | Robert et al. |
| 7,834,074 B2 | 11/2010 | Brunelet et al. |
| 7,882,874 B2 | 2/2011 | Robert et al. |
| 8,344,063 B2 | 1/2013 | Marechal et al. |
| 8,455,584 B2 | 6/2013 | Robert et al. |
| 8,461,269 B2 | 6/2013 | Varagniat et al. |
| 8,492,475 B2 | 7/2013 | Araujo Da Silva et al. |

(Continued)

FOREIGN PATENT DOCUMENTS

| | | |
|---|---|---|
| EP | 0501227 A1 | 9/1992 |
| EP | 0735088 A1 | 10/1996 |

(Continued)

OTHER PUBLICATIONS

International Search Report dated Aug. 17, 2016, issued by EPO in connection with International Application No. PCT/EP2016/066085.

*Primary Examiner* — Hannah J Pak
(74) *Attorney, Agent, or Firm* — Venable LLP

(57) ABSTRACT

A rubber composition is based on at least one diene elastomer with a glass transition temperature (Tg) of less than −40° C., one reinforcing filler at a content from 60 to 110 parts by weight per hundred parts by weight of elastomer (phr), one vulcanization system and one combination of plasticizers, the said combination of plasticizers comprising more than 10 phr of at least one hydrocarbon resin with a glass transition temperature (Tg) of between −40° C. and 20° C. and at least one supplementary plasticizer selected from plasticizing oils, hydrocarbon resins with a Tg of greater than 20° C. and their mixtures, the total content of plasticizer being within a range extending from 25 to 65 phr, the contents of reinforcing filler and of plasticizer being such that the ratio of the total content of filler to the total content of plasticizer is within a range extending from 1.8 to 2.5.

41 Claims, No Drawings

(56) References Cited

U.S. PATENT DOCUMENTS

| | | | |
|---|---|---|---|
| 8,883,929 B2 | 11/2014 | Gandon-Pain et al. | |
| 9,060,566 B2 | 6/2015 | Rapo-Brunet | A43B 13/04 |
| 9,670,291 B2 | 6/2017 | Marechal et al. | |
| 10,059,833 B2* | 8/2018 | Sevignon | C08J 3/215 |
| 2001/0034389 A1 | 10/2001 | Vasseur | |
| 2001/0036991 A1 | 11/2001 | Robert et al. | |
| 2002/0183436 A1 | 12/2002 | Robert et al. | |
| 2004/0051210 A1 | 3/2004 | Tardivat et al. | |
| 2004/0122157 A1* | 6/2004 | Labauze | B60C 1/0016 524/487 |
| 2004/0127617 A1 | 7/2004 | Vasseur et al. | |
| 2004/0132880 A1 | 7/2004 | Durel et al. | |
| 2005/0004297 A1 | 1/2005 | Durel et al. | |
| 2005/0016650 A1 | 1/2005 | Durel et al. | |
| 2005/0016651 A1 | 1/2005 | Durel et al. | |
| 2006/0089445 A1 | 4/2006 | Gandon-Pain | |
| 2007/0167557 A1 | 7/2007 | Dumke et al. | |
| 2008/0009564 A1 | 1/2008 | Robert et al. | |
| 2008/0132644 A1 | 6/2008 | Lapra et al. | |
| 2008/0156404 A1 | 7/2008 | Brunelet et al. | |
| 2009/0186961 A1 | 7/2009 | Arauja Da Silva et al. | |
| 2009/0209709 A1 | 8/2009 | Araujo Da Silva et al. | |
| 2009/0234066 A1 | 9/2009 | Araujo Da Silva et al. | |
| 2009/0270558 A1 | 10/2009 | Gandon-Pain et al. | |
| 2010/0022714 A1 | 1/2010 | Varagniat et al. | |
| 2010/0130639 A1* | 5/2010 | Viola | B60C 1/0016 523/152 |
| 2010/0184912 A1 | 7/2010 | Marechal et al. | |
| 2010/0204359 A1 | 8/2010 | Robert et al. | |
| 2010/0249270 A1 | 9/2010 | Robert et al. | |
| 2010/0252156 A1 | 10/2010 | Robert et al. | |
| 2011/0021702 A1 | 1/2011 | Gandon-Pain et al. | |
| 2011/0152458 A1 | 6/2011 | Araujo Da Silva et al. | |
| 2012/0208948 A1 | 8/2012 | Gandon-Pain et al. | |
| 2012/0252928 A1 | 10/2012 | Marechal et al. | |
| 2013/0331498 A1* | 12/2013 | Miyazaki | B60C 1/0016 524/493 |
| 2014/0235751 A1 | 8/2014 | Lesage et al. | |
| 2014/0243448 A1 | 8/2014 | Lesage et al. | |
| 2014/0336311 A1 | 11/2014 | Rapo-Brunet | A43B 13/04 |
| 2018/0223082 A1 | 8/2018 | Lesage et al. | |

FOREIGN PATENT DOCUMENTS

| | | |
|---|---|---|
| EP | 0810258 A1 | 12/1997 |
| EP | 1127909 A1 | 8/2001 |
| FR | 2740778 A1 | 5/1997 |
| FR | 2765882 A1 | 1/1999 |
| JP | 2001-144262 A | 5/2001 |
| JP | 2005-213486 A | 8/2005 |
| WO | 97/36724 A2 | 10/1997 |
| WO | 99/16600 A1 | 4/1999 |
| WO | 00/05300 A1 | 2/2000 |
| WO | 00/05301 A1 | 2/2000 |
| WO | 01/92402 A1 | 12/2001 |
| WO | 02/30939 A1 | 4/2002 |
| WO | 02/31041 A1 | 4/2002 |
| WO | 02/083782 A1 | 10/2002 |
| WO | 02/088238 A1 | 11/2002 |
| WO | 03/002648 A1 | 1/2003 |
| WO | 03/002649 A1 | 1/2003 |
| WO | 03/016387 A1 | 2/2003 |
| WO | 2004/096865 A1 | 11/2004 |
| WO | 2005/087859 A1 | 9/2005 |
| WO | 2006/061064 A1 | 6/2006 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2008/141702 A1 | 11/2008 |
| WO | 2009/000750 A1 | 12/2008 |
| WO | 2009/000752 A1 | 12/2008 |
| WO | 2011/042507 A1 | 4/2011 |
| WO | 2013/092429 A1 | 6/2013 |

* cited by examiner

RUBBER COMPOSITION INCLUDING A HYDROCARBON RESIN WITH A LOW GLASS TRANSITION TEMPERATURE

FIELD OF THE INVENTION

The invention relates to compositions, in particular for tyres, and more particularly to compositions comprising a plasticizing system based on resin with a low glass transition temperature (Tg).

RELATED ART

Since fuel savings and the need to protect the environment have become a priority, it has proved necessary to produce tyres having a reduced rolling resistance, without adversely affecting other properties of the tyre. Manufacturers have developed to tyre compositions which make it possible to reduce this rolling resistance, in particular by the introduction of silica as reinforcing filler or of resin with a high glass transition temperature as plasticizer.

For example, the Applicant Companies have already described the use of high-Tg resins, as described in the documents WO-2005/087859 and WO-2006/061064.

Some documents describe the use of low-Tg resins, as, for example, in the document JP-2005213486, which provides for the use of low-Tg resin at a content of between 0.5 and 5 phr for improving the tack and the industrial feasibility of the compositions. The document US-2007/0167557 provides for the use of low-Tg resin at a content of 10 phr for improving the chipping resistance. With regard to the document JP-2001144262, it describes compositions, the abrasion resistance and the grip of which are improved and which comprise low-Tg resins.

Nevertheless, manufacturers are always looking for solutions for improving, at the same time, all the types of performance of the compositions for tyres and in particular the rolling resistance and the hardness of the cured compositions, associated with the road behaviour and driving comfort, at the same time as the viscosity of the raw compositions, associated with the ease of industrial processing of the compositions (processability).

The Applicant Companies have now shown that specific compositions based on low-Tg resin make it possible to have an improved compromise between numerous types of performance desired for tyre compositions, that is to say the rolling resistance and the hardness of the cured compositions, at the same time as the viscosity of the raw compositions.

SUMMARY OF THE INVENTION

The invention relates to a rubber composition based on at least one diene elastomer with a glass transition temperature (Tg) of less than −40° C., one reinforcing filler at a content within a range extending from 60 to 110 parts by weight per hundred parts by weight of elastomer (phr), one vulcanization system and one combination of plasticizers, the said combination of plasticizers comprising more than 10 phr (parts by weight per hundred parts by weight of elastomer) of at least one hydrocarbon resin with a glass transition temperature (Tg) of between −40° C. and 20° C. and one supplementary plasticizer selected from the group consisting of plasticizing oils and hydrocarbon resins with a Tg of greater than 20° C., the total content of plasticizer being within a range extending from 25 to 65 phr and the contents of reinforcing filler and of plasticizer being such that the ratio of the total content of filler to the total content of plasticizer is within a range extending from 1.8 to 2.5.

Preferably, the invention relates to a composition as defined above in which the said diene elastomer with a Tg of less than −40° C. is selected from the group consisting of polybutadienes, synthetic polyisoprenes, natural rubber, butadiene copolymers, isoprene copolymers and the mixtures of these elastomers. Preferably, the said diene elastomer with a Tg of less than −40° C. is selected from the group consisting of polybutadienes, copolymers of butadiene and styrene, and the mixtures of these elastomers. Preferably, the diene elastomer with a Tg of less than −40° C. comprises a random copolymer of butadiene and styrene (SBR) at a content within a range extending from 80 to 100 phr, preferably at a content of 100 phr.

Preferably again, the invention relates to a composition as defined above in which the reinforcing filler is selected from the group consisting of silicas, carbon blacks and the mixtures of these. Preferably, the content of reinforcing filler is within a range extending from 65 to 105 phr, preferably from 70 to 100 phr.

According to a preferred embodiment, the invention relates to a composition as defined above in which the predominant reinforcing filler is silica. Preferably, the content of silica is within a range extending from 55 to 105 phr, preferably from 60 to 100 phr.

Preferably, the invention relates to a composition as defined above in which the total content of plasticizers is within a range extending from 30 to 65 phr, from 35 to 60 phr, more preferably from 40 to 55 phr.

Preferably, the invention relates to a composition as defined above in which the content of hydrocarbon resin with a Tg of between −40° C. and 20° C. is within a range extending from more than 10 to 60 phr, preferably from 12 to 40 phr, more preferably from 15 to 35 phr.

Preferably again, the invention relates to a composition as defined above in which the hydrocarbon resin mentioned above as hydrocarbon resin with a Tg of between −40° C. and 20° C. exhibits a Tg of between −40° C. and 0° C., more preferably between −30° C. and 0° C. and more preferably still between −20° C. and 0° C.

Still preferably, the invention relates to a composition as defined above in which the hydrocarbon resin mentioned above as hydrocarbon resin with a Tg of between −40° C. and 20° C. exhibits a number-average molecular weight of less than 800 g/mol, preferably of less than 600 g/mol and more preferably of less than 400 g/mol.

Preferentially, the invention relates to a composition as defined above in which the hydrocarbon resin mentioned above as hydrocarbon resin with a Tg of between −40° C. and 20° C. exhibits a softening point within a range extending from 0° C. to 50° C., preferentially from 0° C. to 40° C., more preferentially from 10° C. to 40° C., preferably from 10° C. to 30° C.

Preferably again, the invention relates to a composition as defined above in which the hydrocarbon resin mentioned above as hydrocarbon resin with a Tg of between −40° C. and 20° C. exhibits a polydispersity index (PI) of less than 3, preferably of less than 2.

Preferably, the invention relates to a composition as defined above in which the content of hydrocarbon resin with a Tg of greater than 20° C. is within a range extending from 5 to 55 phr, preferably from 7 to 40 phr, more preferably from 10 to 35 phr.

Preferably again, the invention relates to a composition as defined above in which the hydrocarbon resin mentioned above as hydrocarbon resin with a Tg of greater than 20° C. exhibits a Tg of greater than 30° C.

More preferably, the invention relates to a composition as defined above in which the hydrocarbon resin mentioned above as hydrocarbon resin with a Tg of greater than 20° C. exhibits a number-average molecular weight of between 400 and 2000 g/mol, preferably between 500 and 1500 g/mol.

Preferably again, the invention relates to a composition as defined above in which the hydrocarbon resin mentioned above as hydrocarbon resin with a Tg of greater than 20° C. exhibits a polydispersity index (PI) of less than 3, preferably of less than 2.

Preferably, the invention relates to a composition as defined above additionally comprising, in the combination of plasticizers, a plasticizing oil.

Preferably, the invention relates to a composition as defined above in which the plasticizing oil is selected from the group consisting of naphthenic oils, paraffinic oils, MES (Medium Extracted Solvates) oils, TDAE (Treated Distillate Aromatic Extracts) oils, mineral oils, vegetable oils, ether plasticizers, ester plasticizers, phosphate plasticizers, sulfonate plasticizers and the mixtures of these compounds.

Preferably again, the invention relates to a composition as defined above in which the content of plasticizing oil is within a range extending from 2 to 40 phr, preferably from 5 to 30 phr.

Alternatively and preferably again, the invention relates to a composition as defined above which does not comprise plasticizing oil in the combination of plasticizers.

More preferably, the invention relates to a composition as defined above in which the ratio of the total content of filler to the total content of plasticizer is within a range extending from 1.8 to 2.4, preferably from 2 to 2.4.

The invention also relates to a tyre comprising a composition as defined above.

Preferably, the invention relates to a tyre as defined above comprising the said composition as defined above in all or part of the tread.

Preferably, the tyre according to the invention will be chosen from the tyres intended to equip a two-wheel vehicle, a passenger vehicle, or also a "heavy-duty" vehicle (that is to say, underground, bus, off-road vehicles, heavy road transport vehicles, such as lorries, tractors or trailers), or also aircraft, construction equipment, heavy agricultural vehicles or handling vehicles.

DETAILED DESCRIPTION OF THE INVENTION

I—Constituents of the Composition

The rubber compositions according to the invention are based on at least one diene elastomer with a glass transition temperature (Tg) of less than $-40°$ C., one reinforcing filler at a content within a range extending from 60 to 110 parts by weight per hundred parts by weight of elastomer (phr), one vulcanization system and one combination of plasticizers, the said combination of plasticizers comprising more than 10 phr (parts by weight per hundred parts by weight of elastomer) of at least one hydrocarbon resin with a glass transition temperature (Tg) of between $-40°$ C. and 20° C. and at least one supplementary plasticizer selected from the group consisting of plasticizing oils, hydrocarbon resins with a Tg of greater than 20° C. and their mixtures, the total content of plasticizer being within a range extending from 25 to 65 phr, the contents of reinforcing filler and of plasticizer being such that the ratio of the total content of filler to the total content of plasticizer is within a range extending from 1.8 to 2.5.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

In the present description, unless expressly indicated otherwise, all the percentages (%) shown are percentages by weight. The abbreviation "phr" means parts by weight per hundred parts of elastomers present in the elastomer matrix, the elastomer matrix denoting all of the elastomers present in the rubber composition.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

Finally, when reference is made to a "predominant" compound, this is understood to mean, within the meaning of the present invention, that this compound is predominant among the compounds of the same type in the composition, that is to say that it is the one which represents the greatest amount by weight among the compounds of the same type. Thus, for example, a predominant reinforcing filler is the reinforcing filler representing the greatest weight with respect to the total weight of the reinforcing fillers in the composition. On the contrary, a "minor" compound is a compound which does not represent the greatest fraction by weight among the compounds of the same type.

I-1 Diene Elastomer

The compositions can comprise just one diene elastomer or a mixture of several diene elastomers.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is to greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, diene elastomer capable of being used in the compositions according to the invention is understood more particularly to mean:
(a) any homopolymer obtained by polymerization of a conjugated diene monomer having from 4 to 12 carbon atoms;
(b) any copolymer obtained by copolymerization of one or more conjugated dienes with one another or with one or more vinylaromatic compounds having from 8 to 20 carbon atoms;
(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d) a copolymer of isobutene and of isoprene (butyl rubber) and also the halogenated versions, in particular chlorinated or brominated versions, of this type of copolymer,
it being understood that, for the requirements of the invention, the elastomers of the above types (a), (b), (c) and (d) which have a Tg of less than −40° C. are concerned.

Although it applies to any type of diene elastomer, a person skilled in the art of tyres will understand that the present invention is preferably employed with essentially unsaturated diene elastomers, in particular of the above type (a) or (b).

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778, U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type.

These functionalized elastomers can be used in a blend with one another or with non-functionalized elastomers. For example, it is possible to use a silanol- or polysiloxane-functionalized elastomer having a silanol end, as a mixture with an elastomer coupled and/or star-branched with tin (described in WO 11/042507), the latter representing a content of 5% to 50%, for example of 25% to 50%.

The following are preferably suitable: polybutadienes and in particular those having a content (mol %) of 1,2-units of between 4% and 80% or those having a content (mol %) of cis-1,4-units of greater than 80%, or butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%.

To summarize, the diene elastomer of the composition is preferably selected from the group of highly unsaturated diene elastomers with a Tg of less than −40° C. is selected from the group consisting of polybutadienes, synthetic polyisoprenes, natural rubber, butadiene copolymers, isoprene copolymers and the mixtures of these elastomers. Such diene elastomers with a Tg of less than −40° C. are more preferably selected from the group consisting of polybutadienes, copolymers of butadiene and styrene, and the mixtures of these elastomers. Very preferably, the diene elastomer with a Tg of less than −40° C. is a random copolymer of butadiene and styrene (SBR).

The content of the diene elastomer with a Tg of less than −40° C. is preferentially within a range extending from 80 to 100 phr, preferably within a range extending from 90 to 100 phr, and very preferably this content is 100 phr.

I-2 Reinforcing Filler

The composition according to the invention comprises a reinforcing filler. Use may be made of any type of reinforcing filler known for its abilities to reinforce a rubber composition which can be used for the manufacture of tyres, for example an organic filler, such as carbon black, a reinforcing inorganic filler, such as silica or alumina, or also a blend of these two types of filler.

All carbon blacks, in particular "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

The composition can comprise one type of silica or a blend of several silicas. The silica used can be any reinforcing silica known to a person skilled in the art, in particular any precipitated or fumed silica exhibiting a BET specific surface and a CTAB specific surface both of less than 450 $m^2$/g, preferably from 30 to 400 $m^2$/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in Application EP-A-0735088, or the silicas with a high specific surface as described in Application WO 03/16837.

The silica preferably has a BET specific surface of between 45 and 400 $m^2/g$, more preferably of between 60 and 300 $m^2/g$.

These compositions can optionally also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Use is made in particular of silane polysulfides, referred to as "symmetrical" or "asymmetrical" depending on their specific structure, such as described, for example, in Applications WO 03/002648 (or US 2005/016651) and WO 03/002649 (or US 2005/016650).

Suitable in particular, without the definition below being limiting, are silane polysulfides referred to as "symmetrical", corresponding to the following general formula (III):

$$Z\text{-}A\text{-}S_x\text{-}A\text{-}Z, \text{ in which:} \quad (III)$$

x is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, in particular $C_1$-$C_4$ alkylenes, especially propylene);

Z corresponds to one of the formulae below:

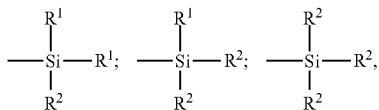

in which:

the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl), the $R^2$ radicals, which are substituted or unsubstituted and identical to or different from one another, represent a $C_1$-$C_{18}$ alkoxy or $C_5$-$C_{18}$ cycloalkoxy group (preferably a group chosen from $C_1$-$C_8$ alkoxys and $C_5$-$C_8$ cycloalkoxys, more preferably still a group chosen from $C_1$-$C_4$ alkoxys, in particular methoxy and ethoxy).

In the case of a mixture of alkoxysilane polysulfides corresponding to the above formula (III), in particular normal commercially available mixtures, the mean value of the "x" indices is a fractional number preferably of between 2 and 5, more preferably of approximately 4. However, the invention can also advantageously be carried out, for example, with alkoxysilane disulfides (x=2).

Mention will more particularly be made, as examples of silane polysulfides, of bis(($C_1$-$C_4$)alkoxy($C_1$-$C_4$)alkylsilyl ($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$) alkylsilylpropyl) polysulfides (in particular disulfides, trisulfides or tetrasulfides), more particularly bis(monoethoxydimethylsilylpropyl) tetrasulfide, such as described in Patent Application WO 02/083782 (or US 2004/132880).

Mention will also be made, as coupling agent other than alkoxysilane polysulfide, of bifunctional POSs (polyorganosiloxanes) or else of hydroxysilane polysulfides ($R^2$=OH in the above formula III), such as described in Patent Applications WO 02/30939 (or U.S. Pat. No. 6,774, 255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the rubber compositions in accordance with the invention, the content of coupling agent is preferably between 4 and 12 phr, more preferably between 5 and 11 phr and more preferably still between 5 and 9 phr.

A person skilled in the art will understand that, as filler equivalent to silica described in the present section, use might be made of a reinforcing filler of another nature, in particular organic, provided that this reinforcing filler is covered with a layer of silica or else comprises functional sites, in particular hydroxyl sites, at its surface which require the use of a coupling agent in order to form the bond between the filler and the elastomer.

The physical state in which the reinforcing filler is provided is not important, whether it is in the form of a powder, of microbeads, of granules, of beads or any other appropriate densified form.

The composition according to the invention comprises a content of reinforcing filler which is within a range extending from 60 to 110 parts by weight per hundred parts by weight of elastomer (phr). Preferably, the content of total reinforcing filler (preferably carbon black and/or silica) is from 65 to 105 phr, more preferably from 70 to 100 phr. Below 60 phr of filler, the composition might be less effective with regard to wear resistance whereas, above 110 phr of filler, the composition might be less effective with regard to rolling resistance.

Predominant reinforcing filler is understood to mean that which exhibits the greatest content among the reinforcing fillers present in the composition. In particular, predominant reinforcing filler is understood to mean any reinforcing filler which represents at least 50% by weight of the reinforcing fillers present, preferably more than 50% and more preferably more than 60%.

According to one embodiment, the composition comprises silica as predominant filler, as an optional blend with carbon black, as minor filler. In this case, the content of silica is preferentially within a range extending from 55 to 105 phr, preferably from 60 to 100 phr. The content of black is preferentially within a range extending from 0 to 50 phr, preferably from 1 to 30 phr. The content of black is preferably within a range extending from 1 to 5 phr and preferably of less than or equal to 4 phr.

I-3 Vulcanization System

The vulcanization system proper is based on sulfur (or on a sulfur-donating to agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

The sulfur is used at a preferred content of between 0.5 and 10 phr, more preferably of between 0.5 and 5 phr, in particular between 0.5 and 3 phr, when the composition of the invention is intended, according to a preferred form of the invention, to constitute a tyre tread.

The vulcanization system of the composition according to the invention can also comprise one or more additional accelerators, for example compounds of the family of the thiurams, zinc dithiocarbamate derivatives, sulfenamides, guanidines or thiophosphates. Use may especially be made of any compound capable of acting as accelerator of the vulcanization of diene elastomers in the presence of sulfur, in particular accelerators of the type of thiazoles and also their derivatives, accelerators of the type of thiurams and zinc dithiocarbamates. These accelerators are more preferably selected from the group consisting of 2-mercaptobenzothiazyl disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and the mixtures of these compounds. Use is preferably made of a primary accelerator of the sulfenamide type.

I-4 Combination of Plasticizers

The composition according to the invention additionally comprises a combination of plasticizers or plasticizing system. This combination of plasticizers is composed at least of a low-Tg hydrocarbon resin and of at least one supplementary plasticizer selected from the group consisting of plasticizing oils, hydrocarbon resins with a Tg of greater than 20° C. and their mixtures.

The total content of plasticizer in the composition is within a range extending from 25 to 65 phr, more preferably from 30 to 65 phr, preferably from 35 to 60 phr, in particular from 40 to 55 phr. Below 30 phr and especially below 25 phr of plasticizer, the composition might be less effective with regard to industrial processability.

I-4-1 Low-Tg Resin

The first plasticizer of the combination of plasticizers of the composition of the invention is a hydrocarbon resin which is viscous at 20° C., referred to as "low-Tg" resin, that is to say which, by definition, exhibits a Tg within a range extending from −40° C. to 20° C.

Preferably, the low-Tg plasticizing hydrocarbon resin exhibits at least any one of the following characteristics:

- a Tg of between −40° C. and 0° C., more preferably between −30° C. and 0° C. and more preferably still between −20° C. and 0° C.;
- a number-average molecular weight (Mn) of less than 800 g/mol, preferably of less than 600 g/mol and more preferably of less than 400 g/mol;
- a softening point within a range extending from 0° C. to 50° C., preferentially from 0° C. to 40° C., more preferentially from 10° C. to 40° C., preferably from 10° C. to 30° C.;
- a polydispersity index (PI) of less than 3, more preferably of less than 2 (as a reminder: PI=Mw/Mn, with Mw the weight-average molecular weight).

More preferably, this low-Tg plasticizing hydrocarbon resin exhibits all of the preferred characteristics above.

The softening point is measured according to Standard ISO 4625 ("Ring and Ball" method). The Tg is measured according to Standard ASTM D3418 (1999). The macrostructure (Mw, Mn and PI) of the hydrocarbon resin is determined by size exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

The thermoplastic hydrocarbon resins can be aliphatic or aromatic or also of the aliphatic/aromatic type, that is to say based on aliphatic and/or aromatic monomers. They can be natural or synthetic and based or not based on petroleum (if such is the case, they are also known under the name of petroleum resins).

Suitable as aromatic monomers are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic monomer is styrene or a vinylaromatic monomer resulting from a $C_9$ fraction (or more generally from a $C_8$ to $C_{10}$ fraction). Preferably, the vinylaromatic monomer is the minor monomer, expressed as molar fraction, in the copolymer under consideration.

According to a particularly preferred embodiment, the plasticizing hydrocarbon resin is selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins and the mixtures of these resins, which can be used alone or in combination with a liquid plasticizer, for example an MES or TDAE oil. The term "terpene" groups together here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Mention will in particular be made, among the above plasticizing hydrocarbon resins, of α-pinene, β-pinene, dipentene or polylimonene homo- or copolymer resins.

The preferred resins above are well known to a person skilled in the art and are commercially available, for example sold as regards:

aliphatic resins: by Cray Valley under the name Wingtack 10 (Mn=480 g/mol; Mw=595 g/mol; PI=1.2; SP=10° C.; Tg=−28° C.);

coumarone/indene resins: by Rutgers Chemicals under the name Novares C30 (Mn=295 g/mol; Mw=378 g/mol; PI=1.28; SP=25° C.; Tg=−19° C.);

aliphatic and aromatic $C_9$ fraction resins: by Rutgers Chemicals under the name Novares TT30 (Mn=329 g/mol; Mw=434 g/mol; PI=1.32; SP=25° C.; Tg=−12° C.) or by Kolon under the name Hikotac LP-9800 (Mn=249 g/mol; Mw=282 g/mol; PI=1.13; SP=20° C.; Tg=−27° C.).

The content of low-Tg plasticizing hydrocarbon resin is greater than or equal to 10 phr, preferably within a range extending from more than 10 to 60 phr, preferentially from 12 to 40 phr, more preferentially still between 15 and 35 phr. This is because, below 10 phr of low-Tg resin, the composition might exhibit problems of tack and thus of industrial processability.

I-4-2 High-Tg Resin

The second plasticizer of the combination of plasticizers of the composition can be a thermoplastic hydrocarbon resin, the Tg of which is greater than 20° C. This resin is a solid at ambient temperature (23° C.), in contrast to a liquid plasticizing compound, such as an oil, or a viscous plasticizing compound, such as a low-Tg resin.

Preferably, the thermoplastic plasticizing hydrocarbon resin exhibits at least any one of the following characteristics:

a Tg of greater than 30° C.;

a number-average molecular weight (Mn) of between 400 and 2000 g/mol, more preferably between 500 and 1500 g/mol;

a polydispersity index (PI) of less than 3, more preferably of less than 2 (as a reminder: PI=Mw/Mn, with Mw the weight-average molecular weight).

More preferably, this thermoplastic plasticizing hydrocarbon resin exhibits all of the preferred characteristics above.

The macrostructure (Mw, Mn and PI) of the hydrocarbon resin is determined by size exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

The thermoplastic hydrocarbon resins can be aliphatic or aromatic or also of the aliphatic/aromatic type, that is to say based on aliphatic and/or aromatic monomers. They can be natural or synthetic and based or not based on petroleum (if such is the case, they are also known under the name of petroleum resins).

Suitable as aromatic monomers are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic monomer is styrene or a vinylaromatic monomer resulting from a $C_9$ fraction (or more generally from a $C_8$ to $C_{10}$ fraction). Preferably, the vinylaromatic monomer is the minor monomer, expressed as molar fraction, in the copolymer under consideration.

According to a particularly preferred embodiment, the plasticizing hydrocarbon resin is selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins, α-methylstyrene homopolymer or copolymer resins and the mixtures of these resins, which can be used alone or in combination with a liquid plasticizer, for example an MES or TDAE oil. The term "terpene" groups together here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Mention will in particular be made, among the above plasticizing hydrocarbon resins, of α-pinene, β-pinene, dipentene or polylimonene homo- or copolymer resins.

The preferred resins above are well known to a person skilled in the art and are commercially available, for example sold as regards:

polylimonene resins: by DRT under the name Dercolyte L120 (Mn=625 g/mol; Mw=1010 g/mol; PI=1.6; Tg=72° C.) or by Arizona under the name Sylvagum TR7125C (Mn=630 g/mol; Mw=950 g/mol; PI=1.5; Tg=70° C.);

$C_5$ fraction/vinylaromatic copolymer resins, in particular $C_5$ fraction/styrene or $C_5$ fraction/$C_9$ fraction copolymer resins: by Neville Chemical Company under the names Super Nevtac 78, Super Nevtac 85 and Super Nevtac 99, by Goodyear Chemicals under the name Wingtack Extra, by Kolon under the names Hikorez T1095 and Hikorez T1100 or by Exxon under the names Escorez 2101 and Escorez 1273;

limonene/styrene copolymer resins: by DRT under the name Dercolyte TS 105 from DRT or by Arizona Chemical Company under the names ZT115LT and ZT5100.

Mention may also be made, as examples of other preferred resins, of phenol-modified α-methylstyrene resins. In order to characterize these phenol-modified resins, it should be remembered that a number referred to as "hydroxyl number" (measured according to Standard ISO 4326 and expressed in mg KOH/g) is used in a known way. α-Methylstyrene resins, in particular those which are phenol-modified, are well known to a person skilled in the art and are commercially available, for example sold by Arizona Chemical under the names Sylvares SA 100 (Mn=660 g/mol; PI=1.5; Tg=53° C.); Sylvares SA 120 (Mn=1030 g/mol; PI=1.9; Tg=64° C.); Sylvares 540 (Mn=620 g/mol; PI=1.3; Tg=36° C.; hydroxyl number=56 mg KOH/g); and Sylvares 600 (Mn=850 g/mol; PI=1.4; Tg=50° C.; hydroxyl number=31 mg KOH/g).

Preferably, the content of plasticizing hydrocarbon resin is within a range extending from 5 to 55 phr, preferentially extending from 7 to 40 phr and more preferably still from 10 to 35 phr.

I-4-3 Plasticizing Oil

The second plasticizer of the combination of plasticizers of the composition can be an extending oil (or plasticizing resin) which is liquid at 20° C., referred to as "low Tg", that is to say which, by definition, exhibits a Tg of less than −20° C., preferably of less than −40° C.

Any extending oil, whether it is of aromatic or non-aromatic nature, known for its plasticizing properties with regard to diene elastomers can be used. At ambient temperature (20° C.), these oils, which are more or less viscous, are liquids (that is to say, as a reminder, substances which have the ability to eventually assume the shape of their container), in contrast in particular to plasticizing hydrocarbon resins, which are by nature solid at ambient temperature. Extending oils selected from the group consisting of naphthenic oils (low or high viscosity, in particular hydrogenated or not), paraffinic oils, MES (Medium Extracted Solvates) oils, TDAE (Treated Distillate Aromatic Extracts) oils, mineral oils, vegetable oils, ether plasticizers, ester plasticizers, phosphate plasticizers, sulfonate plasticizers and the mixtures of these compounds are particularly suitable. For example, mention may be made of those which comprise between 12 and 30 carbon atoms, for example trioctyl phosphate. Mention may in particular be made, as examples of non-aqueous and water-insoluble ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may in particular be made, among the above triesters, of glycerol triesters, preferably predominantly composed (for more than 50%, more preferably for more than 80%, by weight) of an unsaturated $C_{18}$ fatty acid, that is to say selected from the group consisting of oleic acid, linoleic acid, linolenic acid and the mixtures of these acids. More preferably, whether it is of synthetic origin or natural origin (case, for example, of sunflower or rapeseed vegetable oils), the fatty acid used is composed, for more than 50% by weight, more preferably still for more than 80% by weight, of oleic acid. Such triesters (trioleates) having a high content of oleic acid are well known; they have been described, for example, in Application WO 02/088238 as plasticizing agents in tyre treads.

According to a specific embodiment of the invention, when it is included in the composition, the content of extending oil is within a range extending from 2 to 40 phr, more preferably from 5 to 30 phr. Preferably again, the composition of the invention does not comprise a plasticizing oil.

I-5 Ratio of the Contents of Filler and of Plasticizer

According to the invention, the contents of reinforcing filler and of plasticizer are such that the ratio of the total content of filler to the total content of plasticizer is within a range extending from 1.8 to 2.5. Below 1.8, the composition might exhibit a reduced hardness, resulting in a reduced vehicle behaviour performance, whereas, above 2.5, the composition might exhibit a high Mooney value, resulting in a reduced industrial processability.

Preferably, the ratio of the total content of filler to the total content of plasticizer is within a range extending from 1.8 to 2.4 and preferably from 2 to 2.4 and more preferably still from 2.1 to 2.4.

I-6 Other Possible Additives

The rubber compositions in accordance with the invention optionally also comprise all or a portion of the normal additives generally used in elastomer compositions intended in particular for the manufacture of treads, such as, for example, pigments, protective agents, such as antiozone waxes, chemical antiozonants or antioxidants, plasticizing agents other than those described above, anti-fatigue agents, reinforcing resins, or methylene acceptors (for example novolac phenolic resin) or donors (for example HMT or H3M).

Of course, the compositions in accordance with the invention can be used alone or in a blend (i.e., in a mixture) with any other rubber composition which can be used in the manufacture of tyres.

It is obvious that the invention relates to the rubber compositions described above both in the "raw" or non-crosslinked state (i.e., before curing) and in the "cured" or crosslinked, or also vulcanized, state (i.e., after crosslinking or vulcanization).

II—Preparation of the Rubber Compositions

The compositions are manufactured in appropriate mixers, using two successive phases of preparation which are well known to a person skilled in the art: a first phase of thermomechanical working or kneading (sometimes referred to as "non-productive" phase) at high temperature, up to a maximum temperature of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in Applications EP-A-0 501 227, EP-A-0 735 088, EP-A-0 810 258, WO00/05300 or WO00/05301.

The first (non-productive) phase is preferably carried out in several thermomechanical stages. During a first stage, the elastomers, the reinforcing fillers and the combination of plasticizers (and optionally the coupling agents and/or other ingredients, with the exception of the vulcanization system) are introduced into an appropriate mixer, such as an ordinary internal mixer, at a temperature between 20° C. and 100° C. and preferably between 25° C. and 100° C. After a few minutes, preferably from 0.5 to 2 min, and a rise in the temperature to 90° C. to 100° C., the other ingredients (that is to say, those which remain, if not all were put in at the start) are added all at once or in portions, with the exception of the vulcanization system, during a mixing ranging from 20 seconds to a few minutes. The total duration of the kneading, in this non-productive phase, is preferably between 2 and 10 minutes at a temperature of less than or equal to 180° C. and preferably of less than or equal to 170° C.

After cooling the mixture thus obtained, the vulcanization system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or of a plaque, in particular for laboratory characterization, or also extruded, in order to form, for example, a rubber profiled element used in the manufacture of semi-finished products, in order to obtain products such as a tread. These products can subsequently be used in the manufacture of tyres, according to techniques known to a person skilled in the art.

The vulcanization (or curing) is carried out in a known way at a temperature generally between 130° C. and 200° C., under pressure, for a sufficient time which can vary, for example, between 5 and 90 min, as a function in particular of the curing temperature, of the vulcanization system adopted, of the kinetics of vulcanization of the composition under consideration or also of the size of the tyre.

The examples which follow illustrate the invention without, however, limiting it.

III—Exemplary Embodiments of the Invention

III-1 Preparation of the Examples

In the examples which follow, the rubber compositions were produced as described above.

III-2 Characterization of the Examples

In the examples, the rubber compositions are characterized, before and/or after curing, as indicated below.

Mooney Viscosity or Mooney Plasticity (before curing):
Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (MS 1+4) is expressed in "Mooney units" (MU, with 1 MU=0.83 newton·metre). The lower the Mooney value, the lower the viscosity before curing and the better the processability of the composition.

Shore a Hardness:
The Shore A hardness of the compositions after curing is assessed in accordance with Standard ASTM D 2240-86.

Dynamic Properties (after Curing):
The dynamic properties G* and tan(δ)max are measured on a viscosity analyser (Metravib V A4000) according to Standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, at 23° C., according to Standard ASTM D 1349-99, is recorded. A peak-to-peak strain amplitude sweep is carried out from 0.1% to 50% (outward cycle) and then from 50% to 1% (return cycle). The results made use of are the complex dynamic shear modulus (G*) and the loss factor (tan δ). The maximum value of tan δ observed (tan(δ)max) and the difference in complex modulus (ΔG*) between the values at 0.1% and at 50% strain (Payne effect) are shown for the return cycle. The lower the value for the values of tan(δ)max at 23° C., the lower will be the hysteresis of the composition and thus the lower will be the rolling resistance.

III-3 Examples

The compositions are manufactured with introduction of all of the constituents onto an internal mixer, with the exception of the vulcanization system. The vulcanization agents (sulfur and accelerator) are introduced onto an external mixer at low temperature (the constituent rollers of the mixer being at approximately 30° C.).

The object of the examples presented in Table 1 is to compare the different rubber properties of control compositions (C1 to C8) with compositions 11 to 13 in accordance with the invention. The measurement results for the properties measured, before and after curing, are presented in Table 2.

In comparison with the control compositions, it is noted that the compositions in accordance with the invention exhibit the best compromise in types of performance between the Mooney value, the hardness and the measurement of tan(δ)max at 23° C. This is because all the compositions in accordance with the invention make it possible to improve at least one property in comparison with the controls taken separately. These results show that the compositions of the invention make possible good types of performance with regard to the essential aspects, which are the processability, the road behaviour and the rolling resistance. None of the control compositions make possible as good a compromise in all these types of performance simultaneously.

TABLE 1

| Compositions | I1 | I2 | I3 | C1 | C2 | C3 | C4 | C5 | C6 | C7 | C8 |
|---|---|---|---|---|---|---|---|---|---|---|---|
| SBR1 (1) | 100.0 | 100.0 | 100.0 | 100.0 | — | 100.0 | 100.0 | 100.0 | 100.0 | 100.0 | 100.0 |
| SBR2 (2) | — | — | — | — | 100.0 | — | — | — | — | — | — |
| Carbon black (3) | 3.0 | 3.0 | 3.0 | 3.0 | 3.0 | 3.0 | 3.0 | 3.0 | 3.0 | 3.0 | 3.0 |
| Silica (4) | 87.0 | 57.0 | 107.0 | 87.0 | 87.0 | 87.0 | 87.0 | 87.0 | 87.0 | 42.0 | 107.0 |
| Total content of filler | 90.0 | 60.0 | 110.0 | 90.0 | 90.0 | 90.0 | 90.0 | 90.0 | 90.0 | 45.0 | 110.0 |
| Low-Tg resin (5) | 32.5 | 14.5 | 35.0 | — | 32.5 | 11.0 | 8.0 | 3.0 | 56.5 | 32.5 | 12.0 |
| High-Tg resin (6) | 13.5 | 10.5 | 15.0 | 36.0 | 13.5 | 11.0 | 38.0 | 43.0 | 13.5 | 13.5 | 11.0 |
| Plasticizing oil (7) | — | — | 10.0 | 8.0 | — | — | — | — | — | — | — |
| Total content of plasticizer | 46.0 | 25.0 | 60.0 | 44.0 | 46.0 | 22.0 | 46.0 | 46.0 | 70.0 | 46.0 | 23.0 |
| Filler/Plasticizer | 2.0 | 2.4 | 1.8 | 2.0 | 2.0 | 4.1 | 2.0 | 2.0 | 1.3 | 1.0 | 5.2 |
| Coupling agent (8) | 7.0 | 4.6 | 8.5 | 7.0 | 7.0 | 7.0 | 7.0 | 7.0 | 7.0 | 3.4 | 9.4 |
| Antioxidants (9) | 6.5 | 6.5 | 6.5 | 6.5 | 6.5 | 6.5 | 6.5 | 6.5 | 6.5 | 6.5 | 6.5 |
| Stearic acid (10) | 3.0 | 3.0 | 3.0 | 3.0 | 3.0 | 3.0 | 3.0 | 3.0 | 3.0 | 3.0 | 3.0 |
| DPG (11) | 1.8 | 1.6 | 2.1 | 1.8 | 1.8 | 1.8 | 1.8 | 1.8 | 1.8 | 1.6 | 2.3 |
| ZnO (12) | 0.9 | 0.9 | 0.9 | 0.9 | 0.9 | 0.9 | 0.9 | 0.9 | 0.9 | 0.9 | 0.9 |
| Accelerator (13) | 2.3 | 2.3 | 2.3 | 2.3 | 2.3 | 2.3 | 2.3 | 2.3 | 2.3 | 2.3 | 2.3 |
| Sulfur | 1.0 | 1.0 | 1.0 | 1.0 | 1.0 | 1.0 | 1.0 | 1.0 | 1.0 | 1.0 | 1.0 |

(1) SBR (Sn star-branched) with 26% of styrene units and 24% of 1,2-units of the butadiene part (Tg=−48° C.) silanol functional group at the chain end
(2) SBR (Sn star-branched) with 44% of styrene units and 41% of 1,2-units of the butadiene part (Tg=−12° C.) silanol at the chain end
(3) ASTM grade N234 (Cabot)
(4) Silica, Zeosil 1165 MP from Rhodia, "HDS" type
(5) Low-Tg hydrocarbon resin, Hikotack LP-9800 from Kolon
(6) High-Tg C$_9$/DCPD hydrocarbon resin, Escorez 5600 from Exxon (Tg=55° C.)
(7) Glycerol trioleate, sunflower oil comprising 85% by weight of oleic acid, Lubrirob Tod 1880 from Novance
(8) Coupling agent: TESPT (Si69 from Evonik-Degussa)
(9) N-(1,3-Dimethylbutyl)-N'-phenyl-p-phenylenediamine (Santoflex 6-PPD) from Flexsys, 2,2,4-trimethyl-1,2-dihydroquinoline (TMQ) and antiozone wax
(10) Stearin, Pristerene 4931 from Uniqema
(11) Diphenylguanidine, Perkacit DPG from Flexsys
(12) Zinc oxide, industrial grade—Umicore
(13) N-Cyclohexyl-2-benzothiazolesulfenamide (Santocure CBS from Flexsys)

TABLE 2

| Compositions | I1 | I2 | I3 | C1 | C2 | C3 | C4 | C5 | C6 | C7 | C8 |
|---|---|---|---|---|---|---|---|---|---|---|---|
| Mooney | 62.2 | 65.5 | 54.5 | 68.1 | 42.6 | 78.4 | 68.6 | 70.3 | 43.8 | 35.9 | 92.0 |
| Shore A hardness | 60.5 | 58.0 | 60.2 | 60.4 | 59.5 | 71.6 | 59.6 | 61.1 | 49.8 | 45.0 | 78.4 |
| Tan(δ)max at 23° C. | 0.28 | 0.16 | 0.30 | 0.31 | 0.61 | 0.30 | 0.32 | 0.37 | 0.22 | 0.12 | 0.38 |

The invention claimed is:

1. A rubber composition based on a composition comprising:
   a diene elastomer with a glass transition temperature Tg of less than −40° C.;
   a reinforcing filler at a content within a range extending from 60 to 110 phr;
   a vulcanization system; and
   a combination of plasticizers,
   wherein the combination of plasticizers comprises more than 10 phr of a hydrocarbon resin with a glass transition temperature Tg of between −40° C. and 0° C. and a supplementary plasticizer selected from the group consisting of plasticizing oils, hydrocarbon resins with a glass transition temperature Tg of greater than 20° C. and mixtures thereof, the total content of plasticizers being within a range extending from 25 to 65 phr,
   wherein the contents of reinforcing filler and of plasticizers are such that the ratio of the total content of reinforcing filler to the total content of plasticizers is within a range extending from 1.8 to 2.5, and
   wherein the diene elastomer is a random copolymer of butadiene and styrene (SBR) at a content of 100 phr, phr being parts by weight per hundred parts by weight of elastomer.

2. The rubber composition according to claim 1, wherein the reinforcing filler is selected from the group consisting of silicas, carbon blacks and mixtures thereof.

3. The rubber composition according to claim 1, wherein the content of reinforcing filler is within a range extending from 65 to 105 phr.

4. The rubber composition according to claim 3, wherein the content of reinforcing filler is within a range extending from 70 to 100 phr.

5. The rubber composition according to claim 1, wherein 50% or more by weight of the total weight of the reinforcing filler is silica.

6. The rubber composition according to claim 5, wherein the content of silica is within a range extending from 55 to 105 phr.

7. The rubber composition according to claim 6, wherein the content of silica is within a range extending from 60 to 100 phr.

8. The rubber composition according to claim 1, wherein the total content of plasticizers is within a range extending from 30 to 65 phr.

9. The rubber composition according to claim 8, wherein the total content of plasticizers is within a range extending from 35 to 60 phr.

10. The rubber composition according to claim 9, wherein the total content of plasticizers is within a range extending from 40 to 55 phr.

11. The rubber composition according to claim 1, wherein the content of the hydrocarbon resin with a glass transition temperature Tg of between −40° C. and 0° C. is within a range extending from more than 10 to 60 phr.

12. The rubber composition according to claim 11, wherein the content of the hydrocarbon resin with a glass transition temperature Tg of between −40° C. and 0° C. is within a range extending from 12 to 40 phr.

13. The rubber composition according to claim 12, wherein the content of the hydrocarbon resin with a glass transition temperature Tg of between −40° C. and 0° C. is within a range extending from 15 to 35 phr.

14. The rubber composition according to claim 1, wherein the hydrocarbon resin with a glass transition temperature Tg of between −40° C. and 0° C. exhibits a glass transition temperature Tg of between −30° C. and 0° C.

15. The rubber composition according to claim 14, wherein the hydrocarbon resin with a glass transition temperature Tg of between −40° C. and 0° C. exhibits a glass transition temperature Tg of between −20° C. and 0° C.

16. The rubber composition according to claim 1, wherein the hydrocarbon resin with a glass transition temperature Tg of between −40° C. and 0° C. exhibits a number-average molecular weight of less than 800 g/mol.

17. The rubber composition according to claim 16, wherein the hydrocarbon resin with a glass transition temperature Tg of between −40° C. and 0° C. exhibits a number-average molecular weight of less than 600 g/mol.

18. The rubber composition according to claim 1, wherein the hydrocarbon resin with a glass transition temperature Tg of between −40° C. and 0° C. exhibits a number-average molecular weight of less than 400 g/mol.

19. The rubber composition according to claim 1, wherein the hydrocarbon resin with a glass transition temperature Tg of between −40° C. and 0° C. exhibits a softening point within a range extending from 0° C. to 50° C.

20. The rubber composition according to claim 19, wherein the hydrocarbon resin with a glass transition temperature Tg of between −40° C. and 0° C. exhibits a softening point within a range extending from 0° C. to 40° C.

21. The rubber composition according to claim 20, wherein the hydrocarbon resin with a glass transition temperature Tg of between −40° C. and 0° C. exhibits a softening point within a range extending from 10° C. to 40° C.

22. The rubber composition according to claim 21, wherein the hydrocarbon resin with a glass transition temperature Tg of between −40° C. and 0° C. exhibits a softening point within a range extending from 10° C. to 30° C.

23. The rubber composition according to claim 1, wherein the hydrocarbon resin with a glass transition temperature Tg of between −40° C. and 0° C. exhibits a polydispersity index PI of less than 3.

24. The rubber composition according to claim 23, wherein the hydrocarbon resin with a glass transition temperature Tg of between −40° C. and 0° C. exhibits a polydispersity index PI of less than 2.

25. The rubber composition according to claim 1, wherein the supplementary plasticizer is a hydrocarbon resin with a glass transition temperature Tg of greater than 20° C., the content of which is within a range extending from 5 to 55 phr.

26. The rubber composition according to claim 25, wherein the supplementary plasticizer is a hydrocarbon resin with a glass transition temperature Tg of greater than 20° C., the content of which is within a range extending from 7 to 40 phr.

27. The rubber composition according to claim 1, wherein the supplementary plasticizer is a hydrocarbon resin with a glass transition temperature Tg of greater than 20° C., the content of which is within a range extending from 10 to 35 phr.

28. The rubber composition according to claim 25, wherein the hydrocarbon resin with a glass transition temperature Tg of greater than 20° C. exhibits a glass transition temperature Tg of greater than 30° C.

29. The rubber composition according to claim 25, wherein the hydrocarbon resin with a glass transition temperature Tg of greater than 20° C. exhibits a number-average molecular weight of between 400 and 2000 g/mol.

30. The rubber composition according to claim 29, wherein the hydrocarbon resin with a glass transition temperature Tg of greater than 20° C. exhibits a number-average molecular weight of between 500 and 1500 g/mol.

31. The rubber composition according to claim 25, wherein the hydrocarbon resin with a glass transition temperature Tg of greater than 20° C. exhibits a polydispersity index PI of less than 3.

32. The rubber composition according to claim 31, wherein the hydrocarbon resin with a glass transition temperature Tg of greater than 20° C. exhibits a polydispersity index PI of less than 2.

33. The rubber composition according to claim 1, wherein the combination of plasticizers includes a plasticizing oil.

34. The rubber composition according to claim 33, wherein the plasticizing oil is selected from the group consisting of naphthenic oils, paraffinic oils, Medium Extracted Solvates oils, Treated Distillate Aromatic Extracts oils, mineral oils, vegetable oils, ether plasticizers, ester plasticizers, phosphate plasticizers, sulfonate plasticizers and mixtures thereof.

35. The rubber composition according to claim 33, wherein the content of plasticizing oil is within a range extending from 2 to 40 phr.

36. The rubber composition according to claim 35, wherein the content of plasticizing oil is within a range extending from 5 to 30 phr.

37. The rubber composition according to claim 1, wherein the combination of plasticizers does not include a plasticizing oil.

38. The rubber composition according to claim 1, wherein the ratio of the total content of filler to the total content of plasticizers is within a range extending from 1.8 to 2.4.

39. The rubber composition according to claim 38, wherein the ratio of the total content of filler to the total content of plasticizers is within a range extending from 2 to 2.4.

40. A tire comprising the rubber composition according to claim 1.

41. The tire according to claim 40, where the rubber composition constitutes all or part of the tread.

* * * * *